United States Patent [19]

Schwartz et al.

[11] Patent Number: 5,666,463
[45] Date of Patent: Sep. 9, 1997

[54] REDUCTION OF ELECTRIC MOTOR SURGE CURRENT BY NON-LINEAR LIMITING OF RATE OF CHANGE OF ANGULAR VELOCITY

[75] Inventors: Jeffrey D. Schwartz, Loveland; Steve D. Schoenbauer, Longmont, both of Colo.

[73] Assignee: Hewlett-Packard Company, Palo Alto, Calif.

[21] Appl. No.: 721,929

[22] Filed: Sep. 27, 1996

Related U.S. Application Data

[63] Continuation of Ser. No. 510,575, Aug. 2, 1995, abandoned, which is a continuation of Ser. No. 146,559, Nov. 2, 1993, abandoned.

[51] Int. Cl.$^6$ ........................................................ H02P 7/06
[52] U.S. Cl. ........................... 388/804; 388/831; 318/811; 318/254; 318/439
[58] Field of Search ............................ 318/560, 561, 318/566, 568.15, 568.2, 568.22, 569–571, 573, 599, 138, 254, 268, 271, 276, 439, 807–811, 778, 782; 388/804, 805, 811, 819, 842–847, 829, 831, 849, 850

[56] References Cited

U.S. PATENT DOCUMENTS

| | | | |
|---|---|---|---|
| 4,249,117 | 2/1981 | Leukhardt et al. | 318/275 |
| 4,516,059 | 5/1985 | Roberts et al. | 318/847 |
| 4,649,328 | 3/1987 | Leonard et al. | 318/271 |
| 4,651,070 | 3/1987 | Truman et al. | 318/139 X |
| 4,700,120 | 10/1987 | Janes | 318/696 |
| 4,763,347 | 8/1988 | Erdman | 318/254 |
| 4,777,420 | 10/1988 | Dadpey et al. | 318/758 |
| 4,999,557 | 3/1991 | Inoue | 318/609 |
| 5,057,760 | 10/1991 | Dadpey et al. | 318/807 |
| 5,073,748 | 12/1991 | Boehm | 318/569 |
| 5,075,608 | 12/1991 | Erdman et al. | 318/599 |
| 5,224,664 | 7/1993 | Adams, Sr. et al. | 318/566 X |
| 5,289,560 | 2/1994 | Abney | 388/811 |
| 5,309,077 | 5/1994 | Choi | 318/799 |
| 5,331,264 | 7/1994 | Cheng et al. | 318/568.11 |
| 5,442,272 | 8/1995 | Schwartz | 318/778 |

FOREIGN PATENT DOCUMENTS 2261305  6/1991  United Kingdom.

*Primary Examiner*—Brian Sircus
*Attorney, Agent, or Firm*—Augustus W. Winfield

[57] ABSTRACT

A method for reducing power supply current surges and power supply voltage noise in an electric motor control system. The method limits the rate of change of power to the motor. The rate of change of power is limited by microprocessor firmware. Use of firmware reduces the size and weight requirements of motor control hardware and power supply filtering hardware.

2 Claims, 2 Drawing Sheets

1

REDUCTION OF ELECTRIC MOTOR SURGE CURRENT BY NON-LINEAR LIMITING OF RATE OF CHANGE OF ANGULAR VELOCITY

CROSS REFERENCE TO RELATED APPLICATION(S)

This is a continuation of application Ser. No. 08/510,575 filed on Aug. 2, 1995, now abandoned, which is a continuation of application Ser. No. 08/146,559 filed on Nov. 2, 1993, now abandoned.

FIELD OF INVENTION

This invention relates generally to control systems and more specifically to closed loop angular velocity control of a DC electric motor.

BACKGROUND OF THE INVENTION

Microprocessor based motor control systems are commonly used in applications such as video cassette recorder (VCR) head motors, spindle motors for computer flexible disks, spindle motors for compact disks, motors for camcorder drive capstans, and tape drive capstans for tape drives for personal computers. In each of these applications, size and weight are important design parameters. Power supplies are typically designed for relatively constant current requirements and not for high transient current capability as often required by motors. In each of these applications, sensitive analog electronic circuits are affected by power supply noise resulting from motor control circuitry. There is a need for power supply surge current and noise reduction without requiring large and heavy motor control hardware or power supply filter hardware.

SUMMARY OF THE INVENTION

The present invention uses microprocessor firmware to limit the allowed rate-of-change of a numerical value that directly controls power to a motor. By limiting power rate-of-change, power supply surge currents and power supply voltage noise spikes are reduced. The current surges are reduced in a way that preserves the small signal bandwidth of the control system. The current surges are reduced without requiring large and heavy filter hardware.

DETAILED DESCRIPTION OF THE PREFERRED EMBODIMENT OF THE INVENTION

Figure 1:
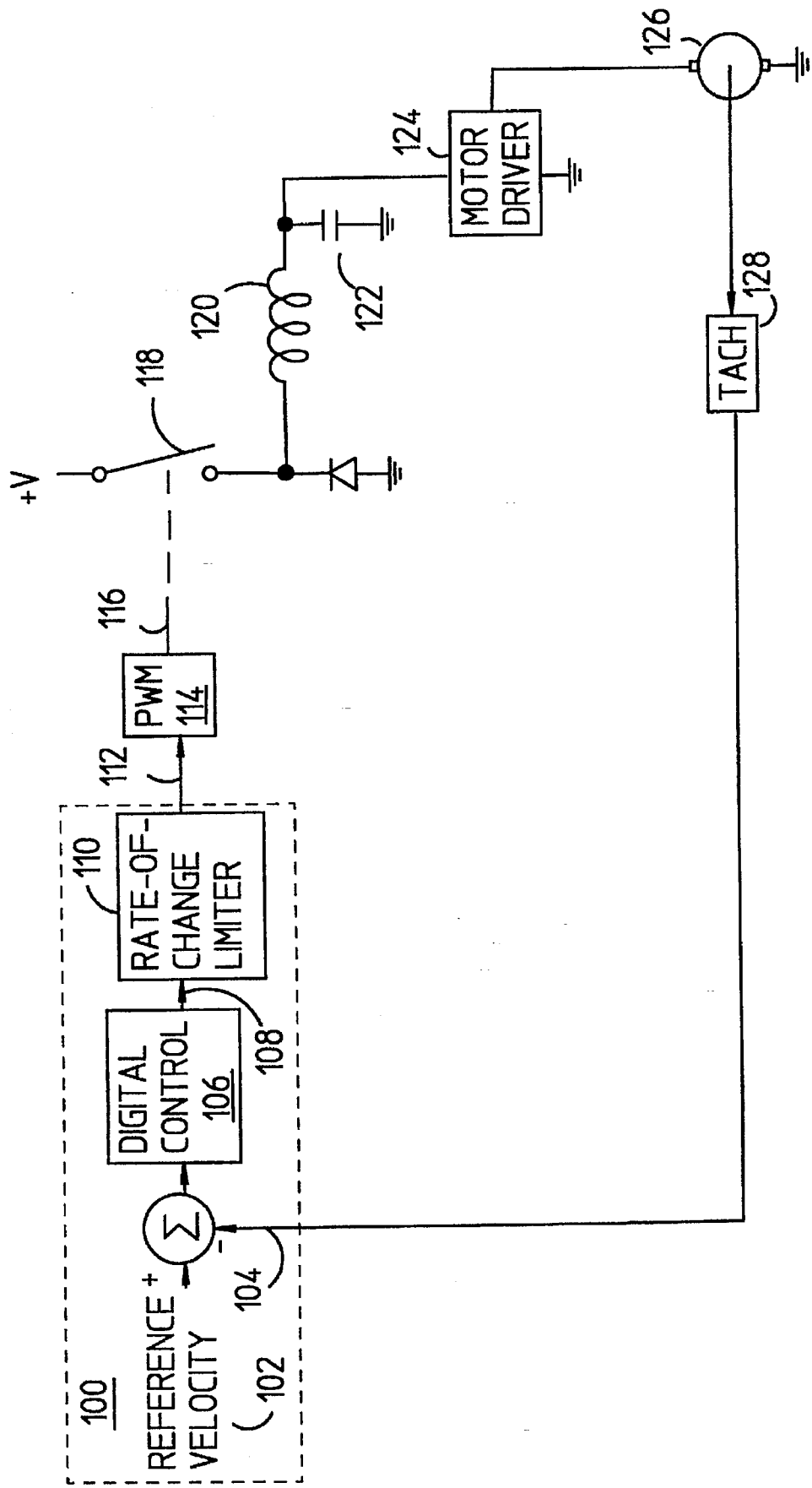
FIG. 1 is a block diagram schematic of a microprocessor based motor control circuit.

FIG. 1 illustrates a microprocessor based motor control system for a small DC electric motor. A microprocessor 100 provides a numerical value 112 that controls the period of a pulse-width-modulated digital signal 116. The pulse-width-modulated signal 116 controls a switch 118 (typically a transistor). Inductor 120 and capacitor 122 provide low pass filtering and energy storage. Motor driver 124 is a commercially available circuit for controlling direction and commutation of a DC electric motor 126. Tachometer 128 provides pulses 104 at a rate proportional to motor angular velocity for feedback to the microprocessor 100. Microprocessor 100 times the interval between tachometer pulses to determine a numerical velocity value for comparison to a reference velocity 102.

Digital control firmware 106 in the microprocessor 100 executes a linear control algorithm to generate an output control value 108. The basic control algorithm within the digital control firmware 106 is as follows:

$$Output = K_P * error + K_I * sum(error) + K_D * d(error)/dt$$

This algorithm is sometimes called the Proportional-Integral-Derivative (PID) algorithm. Basically, the $K_P$ term is proportional to the error signal, the $K_I$ term is related to the integrated error over time and the $K_D$ term is related to the error signal's derivative or rate of change. Note that the $K_D$ term in the PID algorithm amplifies change so that instantaneous changes in the error signal can have significant impact on the output signal. Instantaneous changes in the error signal can occur, for example, from noisy feedback or from arithmetic truncation artifacts due to integer arithmetic in the PID algorithm. In motor control systems as illustrated in FIG. 1 and discussed further below, large changes in the output can have adverse effects on other parts of the system such as power supplies. This adverse impact can be reduced by making $K_D$ small or zero. However, the $K_D$ term is important for short response time (high bandwidth) and control loop stability. A better solution, as described below, is to directly limit the output variable rather than just one term acting on the error variable. In the present invention, the rate of change of the output signal is directly limited by clipping the output rate of change to absolute maximum and minimum values. Limiting the rate of change of the output does not affect the $K_D$ term in the PID algorithm, and for small perturbations of the error signal the clipping has no effect on the bandwidth of the control system.

In the system illustrated in FIG. 1, the feedback path is inherently noisy. The tachometer signal 104 has a certain amount of jitter that is normal and unavoidable. That is, even if the motor 126 is running at a constant angular velocity, there is some variation in the time between tachometer pulses 104. Computation within firmware 106 introduces additional digital noise due to numerical truncation artifacts. It is possible to average the tachometer pulse periods or use other digital filtering techniques to reduce feedback noise. Filtering of pulse periods, however, requires significant processor execution time and does not attenuate numerical truncation artifacts within the digital control firmware 106. In addition, filtering of pulse periods reduces the bandwidth of the control system. For maximum control of angular velocity with minimal response time to angular velocity variations, the control algorithm must operate on unfiltered pulse period data. Therefore, the linear control algorithm inherently amplifies any tachometer jitter. Note that even if the $K_D$ term of the PID algorithm is zero, tachometer pulse periods (and any associated jitter) are amplified by the $K_P$ term. Amplified tachometer noise jitter plus numerical truncation artifacts can result in large instantaneous changes in the pulse-width-modulated signal 116. If inductor 120 is small, instantaneous changes in the pulse-width-modulated signal 116 can result in partial saturation of the inductor 120. Partial saturation results in power supply current surges, creating power supply noise problems for other circuitry.

A large inductor 120 would reduce saturation and current surges. Alternatively, additional power supply filtering would reduce any noise effects on other sensitive circuitry. The control system illustrated in FIG. 1, however, reduces inductor saturation and current surges by use of microprocessor firmware instead of larger, heavier and more expensive hardware. The rate-of-change limiter 110 inhibits the rate of change of the digital signal that directly controls the voltage switch 118. The rate-of-change limiter 110 compares a present value of the control output 108 to the immediately preceding value of the control output 108 and truncates the magnitude of the difference to a predetermined value. The rate-of-change limiter 110 is a simpler and faster computation than tachometer pulse period filtering and also compensates for numerical truncation throughout the digital control firmware 106.

The rate-of-change limiter 110 also has minimal impact on the control system bandwidth. For small signals (small perturbations in angular velocity), there is no effect on bandwidth. Larger angular velocity perturbations with the rate-of-change limiter 110 may cause oscillations, which in turn may require a reduction in gain (with a corresponding reduction in bandwidth) to improve stability. Any bandwidth reduction due to lower gain is still less than bandwidth reduction resulting from filtering of tachometer pulses periods.

In FIG. 1, the digital control output 106 is periodically updated, not necessarily at a constant rate. The pulse width modulator 114 runs at a constant clock rate which is independent of updates of the digital control output 106. There are many modulated pulses 114 for each update of output 106. Each update of the digital control output 106 changes the duty cycle of the immediately ensuing modulated pulses 114 and the duty cycle remains constant until another update of output 106.

Figure 2:
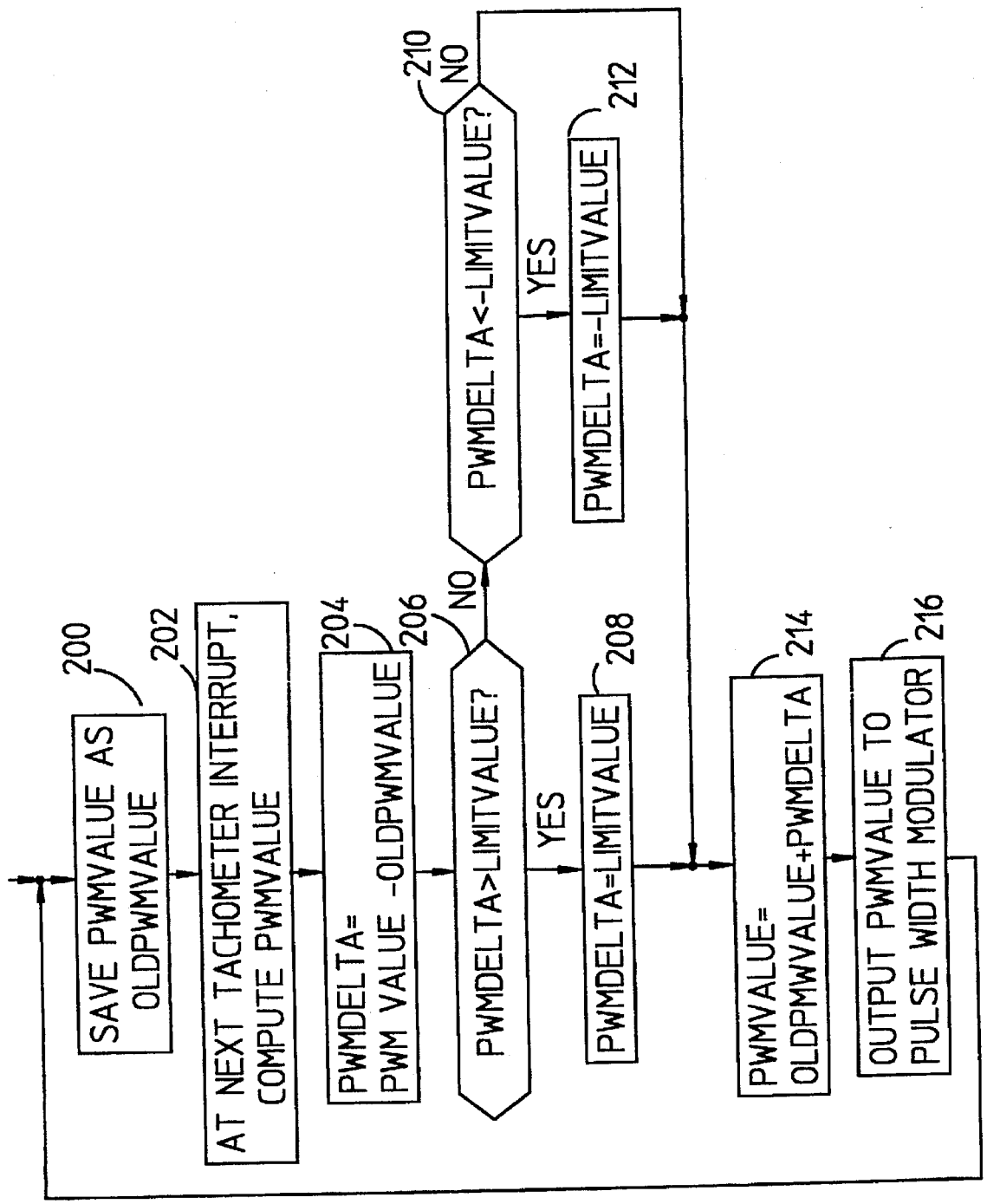
FIG. 2 is a flow chart of microprocessor firmware used to limit the rate of change of a motor control variable.

FIG. 2 is a flow chart illustrating the numerical process performed by the rate-of-change limiter (FIG. 1, 110). The rate-of-change limiter saves the numerical output to the pulse width modulator PWMVALUE (FIG. 1, 112) at each update (step 200). Each time a new update of the numerical output to the pulse width modulator is computed (step 202), the difference between the new value and the saved old value is computed as PWMDELTA (step 204). If the difference between updates is greater than a predetermined value LIMITVALUE (step 206), the difference is truncated to the value LIMITVALUE (step 208). If the difference between updates is more negative than negative LIMITVALUE (step 210), the difference is truncated to negative LIMITVALUE (step 212). The resulting difference, with or without truncation, is added to the saved value (step 214) and the sum is used to drive the pulse width modulator (step 216).

In an example embodiment of FIG. 1, the motor driver circuit 124 is a TDA5145 Brushless DC motor drive circuit from Philips Semiconductors, Marktgroep Philips Components, Postbus 90050, 5600 PB Eindhoven, Netherlands. The motor driver circuit 124 includes the generation of tachometer pulses. Each tachometer pulse 104 interrupts the processor 100. The digital control output 106 is updated on each tachometer pulse interrupt. In the example embodiment, $K_D$ is zero. At the normal design speed of the motor, the tachometer generates 2,020 pulses per second. The inductor 120 is 80 microHenrys. The capacitor 122 is 330 microFarads. The numerical value 112 to the pulse width modulator is an 8-bit number. The pulse width modulator 114 runs at 100,000 pulses per second. The rate of change limiter 110 operates to ensure that the numerical value 112 never changes by more than a value of 6 (approximately 2.3% of the 8-bit range) from one digital control output 108 to the next. In the example embodiment, with the rate of change limited to 6 as described, surge current peaks from the power supply are reduced by a factor of 2 and power supply voltage spikes due to current surges are substantially eliminated.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a microprocessor based closed loop velocity control system for a DC motor, the control system including a power supply for the motor, a pulse width modulator that applies a voltage from the power supply to the motor in variable width pulses, and an inductor-capacitor filter, with the inductor connected between the pulse width modulator and the motor, and the capacitor connected in parallel with the motor, a method for limiting current surge peaks from the power supply to the motor and to the capacitor, the method comprising the following steps:

(a) computing a rate of change of an output variable from the microprocessor that controls a duty cycle of the pulse width modulator; and (b) clamping a magnitude of the rate of change of the output variable if the magnitude is greater than a predetermined limit, wherein clamping the rate of change of the output variable limits the current surge peaks to the motor and to the capacitor.

2. The method of claim 1, the control system further comprising a motor velocity feedback signal comprising a sequence of tachometer pulses, step (a) further comprising:

updating the output variable at each tachometer pulse.

* * * * *